United States Patent
Baehrle-Miller et al.

(10) Patent No.: US 9,725,076 B2
(45) Date of Patent: Aug. 8, 2017

(54) METHOD FOR SECURING A VEHICLE ON A ROLLER DYNAMOMETER

(75) Inventors: Frank Baehrle-Miller, Schoenaich (DE); Dieter Blattert, Kirchheim/Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 123 days.

(21) Appl. No.: 13/880,009

(22) PCT Filed: Oct. 11, 2011

(86) PCT No.: PCT/EP2011/067724
§ 371 (c)(1),
(2), (4) Date: Sep. 12, 2013

(87) PCT Pub. No.: WO2012/052320
PCT Pub. Date: Apr. 26, 2012

(65) Prior Publication Data
US 2013/0345023 A1 Dec. 26, 2013

(30) Foreign Application Priority Data

Oct. 18, 2010 (DE) ........................ 10 2010 042 590

(51) Int. Cl.
*G01L 5/28* (2006.01)
*B60T 7/22* (2006.01)
(Continued)

(52) U.S. Cl.
CPC ................ *B60T 7/22* (2013.01); *G01L 5/282* (2013.01); *G01M 17/0074* (2013.01); *B60T 7/12* (2013.01); *Y10T 477/813* (2015.01)

(58) Field of Classification Search
CPC ...................................................... G01L 5/282
See application file for complete search history.

(56) References Cited

U.S. PATENT DOCUMENTS 1,652,225 A * 12/1927 Wasson ..................... G01L 3/24
73/116.06
2,476,837 A * 7/1949 Cline ........................ F01P 3/20
123/41.08
(Continued)

FOREIGN PATENT DOCUMENTS

| CN | 2427404 | 4/2001 | |
| DE | 3303588 A1 * | 8/1983 | ............ B60T 17/223 |

(Continued)

OTHER PUBLICATIONS

International Search Report dated Jul. 4, 2012 in PCT/EP2011/067724.

*Primary Examiner* — Robert A Siconolfi
*Assistant Examiner* — Ryan Dodd
(74) *Attorney, Agent, or Firm* — Norton Rose Fulbright US LLP; Gerard Messina

(57) ABSTRACT

A method for securing a vehicle, whose wheels of one axle are on a dynamometer, against being unintentionally pushed out of the dynamometer during an inspection of the parking brake. In order to avoid endangerment of people who are in the surroundings of the vehicle, it is proposed to ascertain with the aid of a sensor system whether the vehicle is located on a dynamometer and, if this has been determined, to automatically generate a braking torque at a wheel brake of at least one wheel, which is located outside the dynamometer, after a control element of the parking brake has been operated.

21 Claims, 1 Drawing Sheet

(51) Int. Cl.
   *G01M 17/007*   (2006.01)
   *B60T 7/12*   (2006.01)

(56) References Cited

U.S. PATENT DOCUMENTS

| | | | | |
|---|---|---|---|---|
| 5,430,645 A * | 7/1995 | Keller | | 701/22 |
| 2008/0022761 A1* | 1/2008 | Seibl | G01M 17/0074 | 73/126 |
| 2008/0041147 A1* | 2/2008 | David | G01L 5/282 | 73/117.01 |
| 2008/0209994 A1* | 9/2008 | Matsumoto | G01M 17/0074 | 73/116.07 |
| 2011/0276245 A1* | 11/2011 | Krueger et al. | | 701/71 |
| 2013/0338849 A1* | 12/2013 | Harris | G06F 17/00 | 701/1 |

FOREIGN PATENT DOCUMENTS

| | | | |
|---|---|---|---|
| DE | 34 39 619 | 4/1986 | |
| DE | 40 31 838 | 4/1991 | |
| EP | 1 887 336 | 2/2008 | |
| GB | 2382632 A * | 6/2003 | B60T 8/1806 |

\* cited by examiner

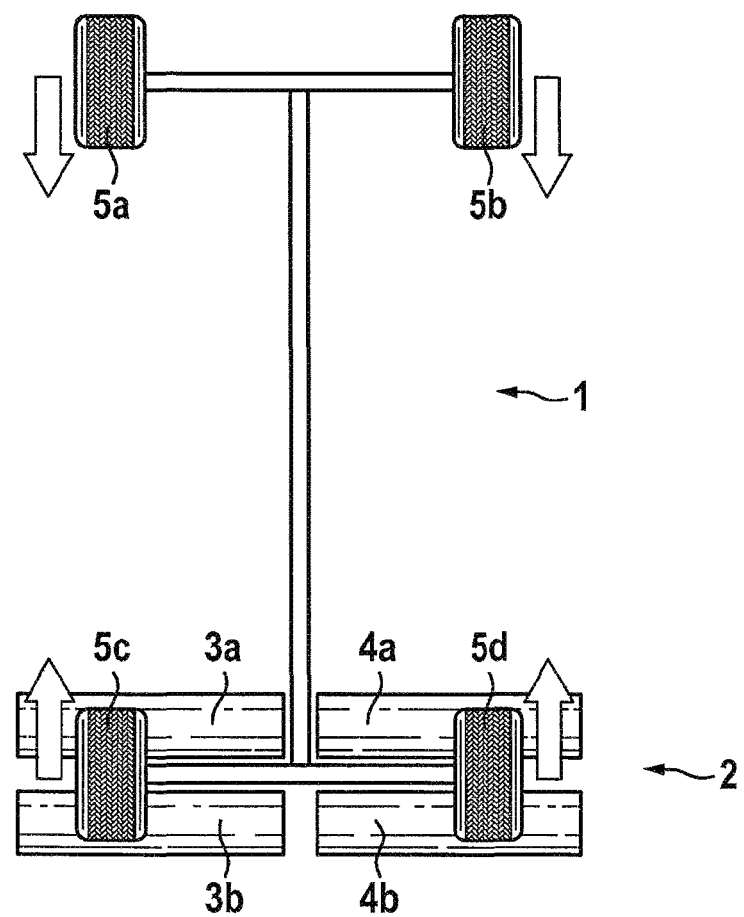

METHOD FOR SECURING A VEHICLE ON A ROLLER DYNAMOMETER

FIELD OF THE INVENTION

The present invention relates to a method for securing a vehicle, whose wheels of one axle are on a roller dynamometer, against being unintentionally pushed out of the dynamometer.

BACKGROUND INFORMATION

To inspect the parking brake system, a motor vehicle is in most cases driven onto a so-called roller dynamometer which drives the axle standing on the dynamometer with the aid of rollers. After operating the parking brake, the braking torque is displayed for each of the braked wheels. The level of the braking torque and, if applicable, the deviation between the left and the right wheels of the vehicle may thus be displayed and evaluated.

In particular, parking brakes operated in an automated manner build up a great braking torque in a relatively short period of time. When a vehicle having an automated parking brake is on the roller dynamometer, it is possible, due to the driving effect of the rollers and the simultaneous buildup of braking torque at the parking brake, that the vehicle is pushed out of the dynamometer. In this case, the vehicle must be backed again onto the dynamometer for a new test. However, it is essentially more critical that people who are close to the vehicle may be harmed due to the unexpected movement of the vehicle.

SUMMARY OF THE INVENTION

It is thus an object of the present invention to provide a method for securing a vehicle, whose wheels of one axle are on a roller dynamometer, against being unintentionally pushed out of the dynamometer.

This object is achieved according to the present invention by the features provided herein. Additional embodiments of the present invention are the subject matter of the further descriptions herein.

According to the present invention, it is ascertained with the aid of a sensor system whether the vehicle is located on a roller dynamometer and, if this has been determined, to automatically activate the wheel brake of at least one wheel which is located outside the roller dynamometer, after the parking brake has been operated. The vehicle is thus braked at at least one wheel, which is located outside the roller dynamometer, and can thus no longer be pushed out of the roller dynamometer.

The triggering condition for the activation of the at least one wheel brake may, for example, be the operation of a control element, e.g., a push button of the parking brake.

In most of today's vehicles, the parking brake is located at the wheels of the rear axle. In this case, the wheel brake of at least one front wheel is activated. All front wheels may be automatically braked.

According to one specific embodiment of the present invention, the braking torque is built up with the aid of an actuator of the service braking system, e.g., a hydraulic pump. For this purpose, the actuator is activated accordingly by a control unit.

For the implementation of the present invention, it is important to detect with high reliability that the vehicle is located on a roller dynamometer. According to the present invention, this is detected by checking one or multiple conditions such as that the wheels of one axle rotate at a certain speed, while the wheels of another axle stand still. Additionally, the condition may be predefined that this state must last longer than a predefined time period. An alternative or additional condition may also be that the ignition is switched on and/or that the transmission is in neutral. Optionally, the signal of an acceleration sensor may be evaluated which measures a longitudinal acceleration. When driving onto a roller dynamometer, a short acceleration impulse is generated which is followed by an approximately constant signal, since the vehicle is at a standstill. By evaluating an acceleration sensor, it may thus be detected, possibly in combination with one of the conditions mentioned previously, whether the vehicle is located on a roller dynamometer.

According to one specific embodiment of the present invention, the at least one activated wheel brake is automatically released as soon as a request for releasing the parking brake, e.g., by operating a push button, has been detected. However, the braking torque may optionally also be reduced only when a starting request is detected, when a gear is engaged, or the accelerator pedal is operated, for example.

The braking torque generated at the wheel(s) located outside the dynamometer should be built up in such a way that the vehicle is prevented from moving out of the dynamometer laterally or forward. According to a first specific embodiment of the present invention, the braking torque is initially increased at at least one wheel located outside the dynamometer and the parking brake is not engaged until the braking torque has reached a predefined value or an appropriate hydraulic pressure of 20 bar to 40 bar, for example, has been reached.

Alternatively, the parking brake may, however, also be engaged simultaneously with the wheel brake(s); in this case, the force build-up gradient at the parking brake should be smaller than at the automatically operated wheel brakes.

The present invention is elucidated below in greater detail on the basis of the appended drawing by way of example.

BRIEF DESCRIPTION OF THE DRAWING

The FIGURE shows a schematic representation of a vehicle which is located on a roller dynamometer.

DETAILED DESCRIPTION

FIG. 1 shows a schematic view of a two-axle motor vehicle whose wheels $5c$, $5d$ of the rear axle are on a roller dynamometer 2. For each wheel $5c$, $5d$, the roller dynamometer includes two rollers $3a$, $3b$ or $4a$, $4a$, respectively, one of which is driven at any given time (e.g., $3a$, $4a$). In order to test the functionality of the parking brake situated at rear wheels $5c$, $5d$, the push button of the parking brake is initially operated and brake pressure is automatically built up at the rear wheels. Rollers $3a$, $3b$; $4a$, $4b$ of roller dynamometer 2 are braked as a consequence. The braking torque applied during this process is displayed separately for each of wheels $5c$, $5d$ and may be evaluated.

To prevent the vehicle from canting or being pushed out of the dynamometer due to forces arising during this process, the wheel brakes of front wheels $5a$, $5b$ are automatically activated.

According to one exemplary embodiment of the present invention, it is ascertained with the aid of a sensor system whether the vehicle is located on a roller dynamometer. For this purpose, one or multiple conditions may be monitored;

for example, whether wheels 5*c*, 5*d* of the rear axle rotate at a certain speed, e.g., between 5 km/h and 7 km/h, while wheels 5*a*, 5*b* of the front axle stand still; whether this state possibly lasts longer than a predefined time period; whether the ignition is switched on or whether the transmission is in neutral.

If it has been determined that the vehicle is located on a roller dynamometer, braking torque is built up automatically at the wheel brakes of front wheels 5*a*, 5*b* upon a request of the parking brake via the control element. For this purpose, an actuator of the service braking system, e.g., a hydraulic pump, is activated accordingly. The two front wheels 5*a*, 5*b* are braked as a consequence so that the vehicle may no longer be pushed easily out of the roller dynamometer.

The braking torque at front wheels 5*a*, 5*b* is built up as soon as the control element of the parking brake has been operated. The build up of the braking force or the braking torque at front wheels 5*a*, 5*b* may take place faster than at the parking brake. A pressure of approximately 20 bar to 40 bar at front wheels 5*a*, 5*b* is usually sufficient to secure the vehicle.

What is claimed is:

1. A method, the method comprising:
   determining, using a sensor system, that wheels of a first axle of the vehicle are located on a roller dynamometer and that wheels of a second axle are not located on the roller dynamometer;
   determining, using the sensor system, that a control element of a parking brake of the vehicle has been operated so that a first braking torque is demanded at the wheels of the first axle; and
   responsive to the determination that the wheels of the first axle of the vehicle are located on the roller dynamometer and to the determination that the control element of the parking brake has been operated, actuating an actuator to automatically build up a second braking torque at at least one wheel brake of a wheel of the second axle.

2. The method of claim 1, wherein the wheels of the second axle are front wheels of the vehicle.

3. The method of claim 1, wherein the second braking torque is built up using an actuator of the at least one wheel brake of the wheel of the second axle.

4. The method of claim 1, wherein the second braking torque is reduced when a request for releasing the parking brake has been detected.

5. The method of claim 1, wherein for determining that the vehicle is located on the roller dynamometer at least one of the following conditions is monitored: (i) the wheels of the first axle rotate at a certain speed, and the wheels of the second axle stand still; (ii) the wheels of the first axle rotate at a certain speed, and the wheels of the second axle stand still for a period of time longer than a predefined time period; (iii) an ignition is on or off; (iv) a transmission is in neutral; and (v) a zero longitudinal acceleration of the vehicle is detected.

6. A control unit of a vehicle, comprising:
   a sensor system configured to determine that wheels of a first axle of the vehicle are located on a roller dynamometer and that wheels of a second axle are not located on the roller dynamometer, and to determine that a control element of a parking brake of the vehicle has been operated so that a first braking torque is demanded at the wheels of the first axle; and
   an actuator, responsive to the determination that the wheels of the first axle of the vehicle are located on the roller dynamometer and to the determination that the control element of the parking brake has been operated, configured to automatically build up a second braking torque at at least one wheel brake of a wheel of the second axle.

7. The control unit of claim 6, wherein the wheels of the second axle are front wheels of the vehicle.

8. The control unit of claim 6, wherein the second braking torque is built up using the actuator of the at least one wheel brake of the wheel of the second axle.

9. The control unit of claim 6, wherein the second braking torque is reduced when a request for releasing the parking brake has been detected.

10. The control unit of claim 6, wherein for determining that the vehicle is located on the roller dynamometer at least one of the following conditions is monitored: (i) the wheels of the first axle rotate at a certain speed, and the wheels of the second axle stand still; (ii) the wheels of the first axle rotate at a certain speed, and the wheels of the second axle stand still for a period of time longer than a predefined time period; (iii) an ignition is on or off; (iv) a transmission is in neutral; and (v) a zero longitudinal acceleration of the vehicle is detected.

11. The control unit of claim 10, wherein the wheels of the second axle are front wheels of the vehicle, and wherein the second braking torque is built up using the actuator of the at least one wheel brake of the wheel of the second axle.

12. The control unit of claim 11, wherein the second braking torque is reduced when a request for releasing the parking brake has been detected.

13. The control unit of claim 6, wherein the wheels of the second axle are front wheels of the vehicle, and wherein the second braking torque is built up using an actuator of the at least one wheel brake of the wheel of the second axle.

14. The control unit of claim 13, wherein the second braking torque is reduced when a request for releasing the parking brake has been detected.

15. The method of claim 5, wherein the wheels of the second axle are front wheels of the vehicle, and wherein the second braking torque is built up using the actuator of the at least one wheel brake of the wheel of the second axle.

16. The method of claim 15, wherein the second braking torque is reduced when a request for releasing the parking brake has been detected.

17. The method of claim 1, wherein the wheels of the second axle are front wheels of the vehicle, and wherein the second braking torque is built up using the actuator of the at least one wheel brake of the wheel of the second axle.

18. The method of claim 17, wherein the second braking torque is reduced when a request for releasing the parking brake has been detected.

19. The method of claim 5, wherein for determining whether the vehicle is located on the roller dynamometer the wheels of the first axle rotate at a certain speed, and the wheels of the second axle stand still.

20. The method of claim 5, wherein for determining whether the vehicle is located on the roller dynamometer the wheels of the first axle rotate at a certain speed, and the wheels of the second axle stand still for a period of time longer than a predefined time period.

21. The method of claim 5, wherein for determining whether the vehicle is located on the roller dynamometer it is monitored whether a transmission is in neutral.

* * * * *